United States Patent
Favaretto

(10) Patent No.: US 12,043,222 B2
(45) Date of Patent: Jul. 23, 2024

(54) PNEUMATIC WINDSCREEN WIPER FOR A TRANSPARENT ELEMENT OF A VEHICLE

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 428 days.

(21) Appl. No.: 17/614,588

(22) PCT Filed: May 20, 2021

(86) PCT No.: PCT/IB2021/054382
§ 371 (c)(1),
(2) Date: Nov. 29, 2021

(87) PCT Pub. No.: WO2021/234629
PCT Pub. Date: Nov. 25, 2021

(65) Prior Publication Data
US 2023/0064128 A1    Mar. 2, 2023

(30) Foreign Application Priority Data

May 20, 2020    (IT) .................... 102020000011689

(51) Int. Cl.
*B60S 1/54*    (2006.01)
*B60S 1/56*    (2006.01)

(52) U.S. Cl.
CPC .. *B60S 1/54* (2013.01); *B60S 1/56* (2013.01)

(58) Field of Classification Search
CPC .................................. B60S 1/54; B60S 1/56
USPC .............. 296/96.15, 96.16; 15/250.001, 313
See application file for complete search history.

(56) References Cited

U.S. PATENT DOCUMENTS

| 10,471,937 B2* | 11/2019 | Davis ................ H01L 21/67028 |
| 2011/0197384 A1* | 8/2011 | Grandjean ............ F24H 9/1827 |
| | | 15/250.01 |
| 2014/0117701 A1 | 5/2014 | Davis et al. |

FOREIGN PATENT DOCUMENTS

| JP | 752755 A | 2/1995 |
| JP | 200287219 A | 3/2002 |
| KR | 1020070097388 A | 10/2007 |
| WO | 2009060413 A2 | 5/2009 |
| WO | 2016177380 A1 | 11/2016 |

OTHER PUBLICATIONS

International Search Report and Written Opinion for Application No. PCT/IB2021/054382 mailed Aug. 26, 2021, 13 pages.

* cited by examiner

*Primary Examiner* — Amy R Weisberg
*Assistant Examiner* — Dana D Ivey
(74) *Attorney, Agent, or Firm* — CANTOR COLBURN LLP

(57) ABSTRACT

A pneumatic windscreen wiper for a transparent element of a vehicle. The pneumatic windscreen wiper has: at least one nozzle, which is arranged at an edge of the transparent element, is oriented towards the transparent element and is capable of emitting a compressed air jet that hits the transparent element to skim the transparent element; a source of compressed air; and a control valve which is interposed between the nozzle and the source of compressed air and is suitable for regulating the flow of compressed air.

10 Claims, 4 Drawing Sheets

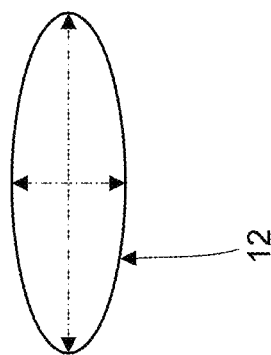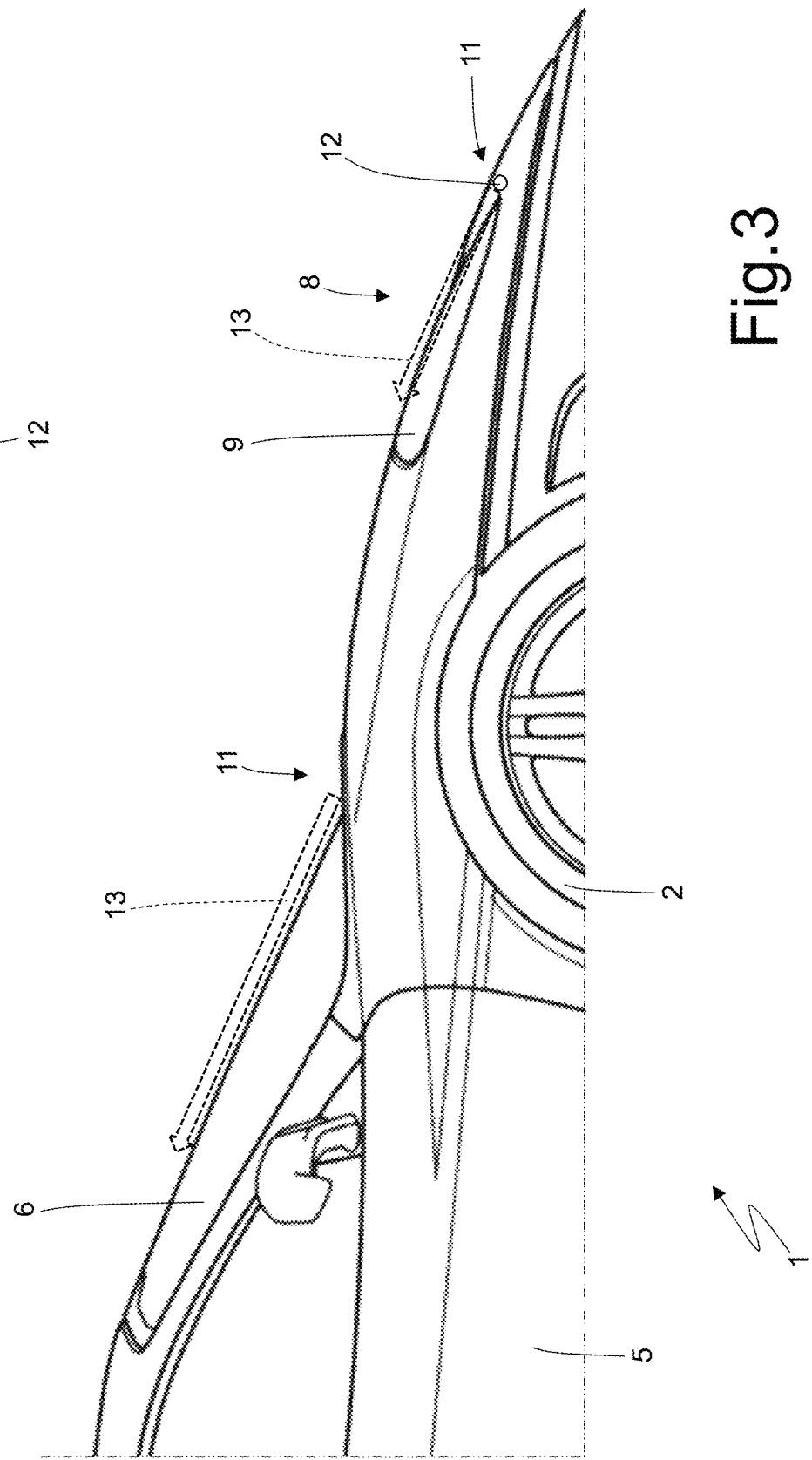

PNEUMATIC WINDSCREEN WIPER FOR A TRANSPARENT ELEMENT OF A VEHICLE

CROSS-REFERENCE TO RELATED APPLICATIONS

This patent application claims priority from Italian patent application no. 102020000011689 filed on 20 May 2020, the entire disclosure of which is incorporated herein by reference.

TECHNICAL FIELD

The invention relates to a pneumatic windscreen wiper for a transparent element of a vehicle.

The invention finds advantageous application in a pneumatic windscreen wiper for a transparent element of a car, to which explicit reference will be made in the description below without because of this loosing in generality.

PRIOR ART

A windscreen wiper is a device used to eliminate rain, snow and dust from the windscreen (or from another transparent element, such as the glasses covering the headlamps or the rear window).

A windscreen wiper traditionally comprises at least one elastic brush, which is held pressed against the windscreen by an arm provided with a spring and moved back and forth at an adjustable speed by an electric or pneumatic motor (vehicles provided with compressed air brakes sometimes use air-operated windscreen wipers, through a mechanism that leads air from the braking system to a pneumatic motor located just under the windscreen).

Modern windscreen wipers prove to be effective in properly keeping the windscreen clean; however, their presence rises both a problems in terms of aerodynamic efficiency and an aesthetic problem. Furthermore, modern windscreen wipers require a fairly frequent replacement of the brushes in order to preserve their cleaning effectiveness. Modern windscreen wipers are relatively large-sized (due to the dimensions of the electric motor and of the moving mechanism) and, hence, pose a significant limitation to the definition of the architecture of the car. Finally, modern windscreen wipers are relatively fragile and, hence, can be damaged, for example while washing the car in automated washing stations.

Documents US2014117701A1, JP2002087219A, KR20070097388A, WO2009060413A2, JPH0752755A and WO2016177380A1 disclose a pneumatic windscreen wiper for a transparent element of a vehicle comprising a plurality of nozzles, each arranged at an edge of the transparent element, oriented towards the transparent element and adapted to emit a compressed air jet that hits the transparent element to skim the transparent element.

DESCRIPTION OF THE INVENTION

The object of the invention is to provide a pneumatic windscreen wiper for a transparent element of a vehicle, said pneumatic windscreen wiper not being affected by the aforementioned drawbacks and, at the same time, being also capable of being manufactured in a straightforward and low-cost manner.

According to the invention, there is provided a pneumatic windscreen wiper for a transparent element of a vehicle according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein:

FIG. 3 is a side view of part of the car of FIG. 1;

FIG. 4 is a view, on a larger scale, of a nozzle of a pneumatic windscreen wiper.

PREFERRED EMBODIMENTS OF THE INVENTION

Figure 1:
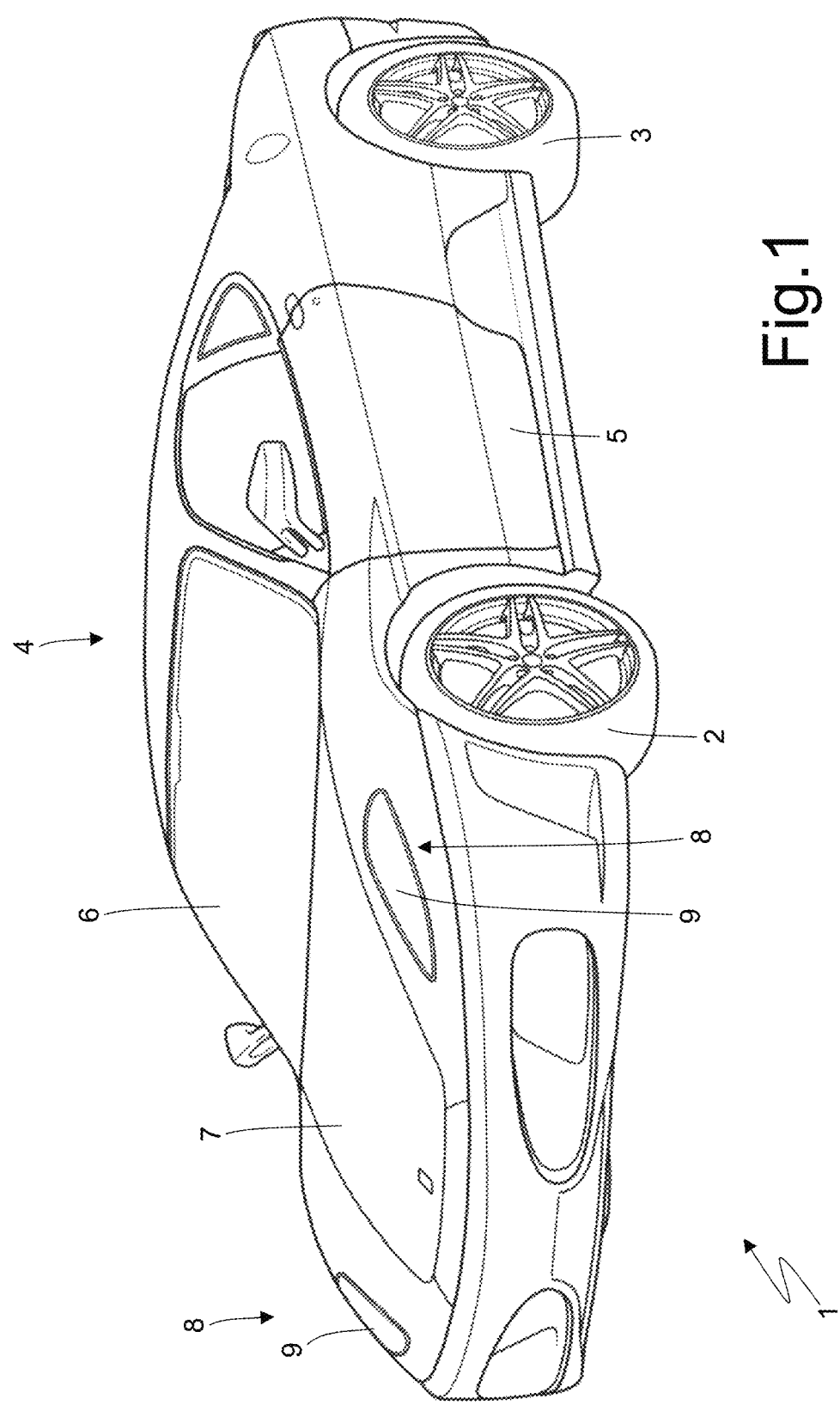
FIG. 1 is a perspective view of a car provided with three pneumatic windscreen wipers according to the invention.

In FIG. 1, number 1 indicates, as a whole, a car with a rear (or central) engine comprising a chassis, which supports a pair of front wheels 2 and a pair of rear wheels 3.

Between the front wheels 2 and the rear wheels 3 there is a passenger compartment 4, to which access is granted through a pair of doors 5; at the front the passenger compartment 5 is delimited by a windscreen 6. In front of the passenger compartment 4 there is a front compartment (for example, though not exclusively, for baggage), which is closed at the top by a front hinged hood 7. On the sides of the front hood 7 there are two headlamps 8, each closed at the front by a transparent glass 9. Behind the passenger compartment 4 there is a rear engine compartment, which is closed at the top by a hinged rear hood 10 (shown in FIG. 2), which is transparent and the centre and is usually arranged in a substantially horizontal position.

Figure 2:
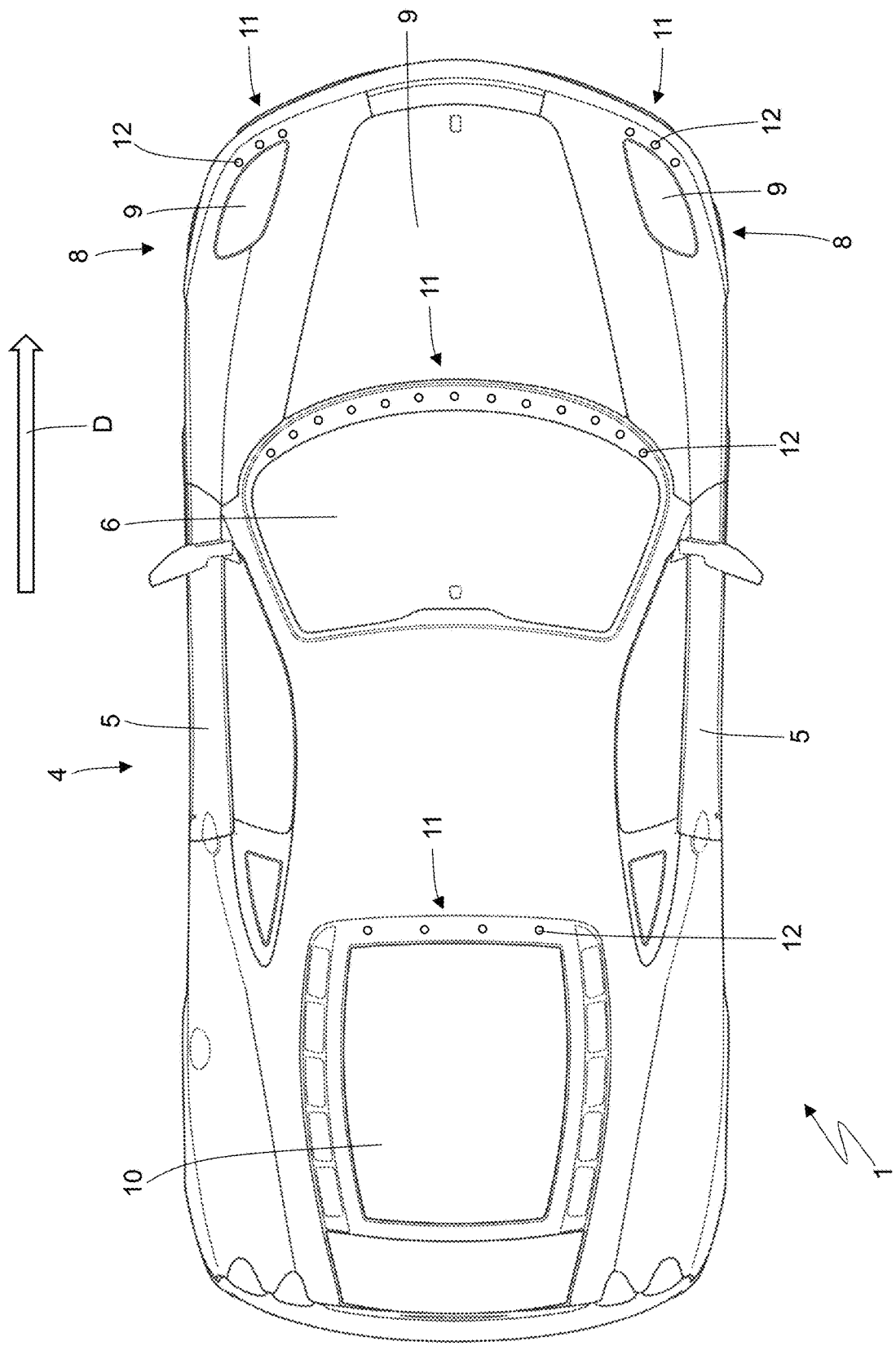
FIG. 2 is a top view of the car of FIG. 1.

According to FIG. 2, the car 1 comprises four pneumatic wipers 11: a first pneumatic wiper 11 is coupled to the windscreen 6 in order to clean the windscreen 6, two second pneumatic wipers 11 are coupled to the transparent glasses 9 of the two headlamps 8 in order to clean the transparent glasses 9 and a third pneumatic wiper 11 is coupled to the rear hood 10 in order to clean the rear hood 10.

Each pneumatic wiper 11 comprises a plurality of nozzles 12, which are arranged side by side and at a given distance from one another along an edge of the corresponding transparent element 6, 9 or 10; each nozzle 12 is oriented towards the corresponding transparent element 6, 9 or 10 and is designed to emit a compressed air jet 13 (schematically shown in FIG. 3), which hits the corresponding transparent element 6, 9 or 10 so as to skim the corresponding transparent element 6, 9 or 10. In particular, the compressed air jet 13 emitted by each nozzle 12 is oriented parallel to the corresponding transparent element 6, 9 or 10. In a same wiper 11, the nozzles 12 could have a non-uniform distribution in the space (namely, mutual distance): for example, in the case of the windscreen 6, the nozzles 12 could be closer to one another in the area of the windscreen 6 in front of the driver and farther from one another in the area of the windscreen 6 in front of the passenger.

The compressed air jet 13 emitted by each nozzle 12 preferably is a supersonic jet, namely the compressed air flowing out of the nozzle 12 has a moving speed that is greater than the speed of sound; in other words, each nozzle 12 is shaped so as to emit the compressed air jet 13 at a supersonic speed.

In each pneumatic wiper 11, the nozzles 12 are preferably arranged in the area of a front edge of the corresponding transparent element 6, 9 or 10 relative to a travel direction D of the vehicle 1; in this way, the air flow generated by the movement of the car 1 adds to the compressed air jets 13 emitted by the nozzles 12, thus increasing the effectiveness thereof.

According to a possible embodiment, at least some nozzles 12 have an elongated shape (as shown in FIG. 4) having a greater transverse dimension, which is perpendicular to the travel direction D of the car 1, than a longitudinal dimension, which is parallel to the travel direction D of the car 1; this embodiment allows one single nozzle 12 to hit, with its compressed air jet 13, a larger surface of the corresponding transparent element 6, 9 or 10 and, therefore, allows the nozzles 12 to be more widely spaced apart from one another (obviously, this solution mainly applies when the corresponding transparent element 6, 9 or 10 is large-sized, which is the case with the windscreen 6).

Figure 5:
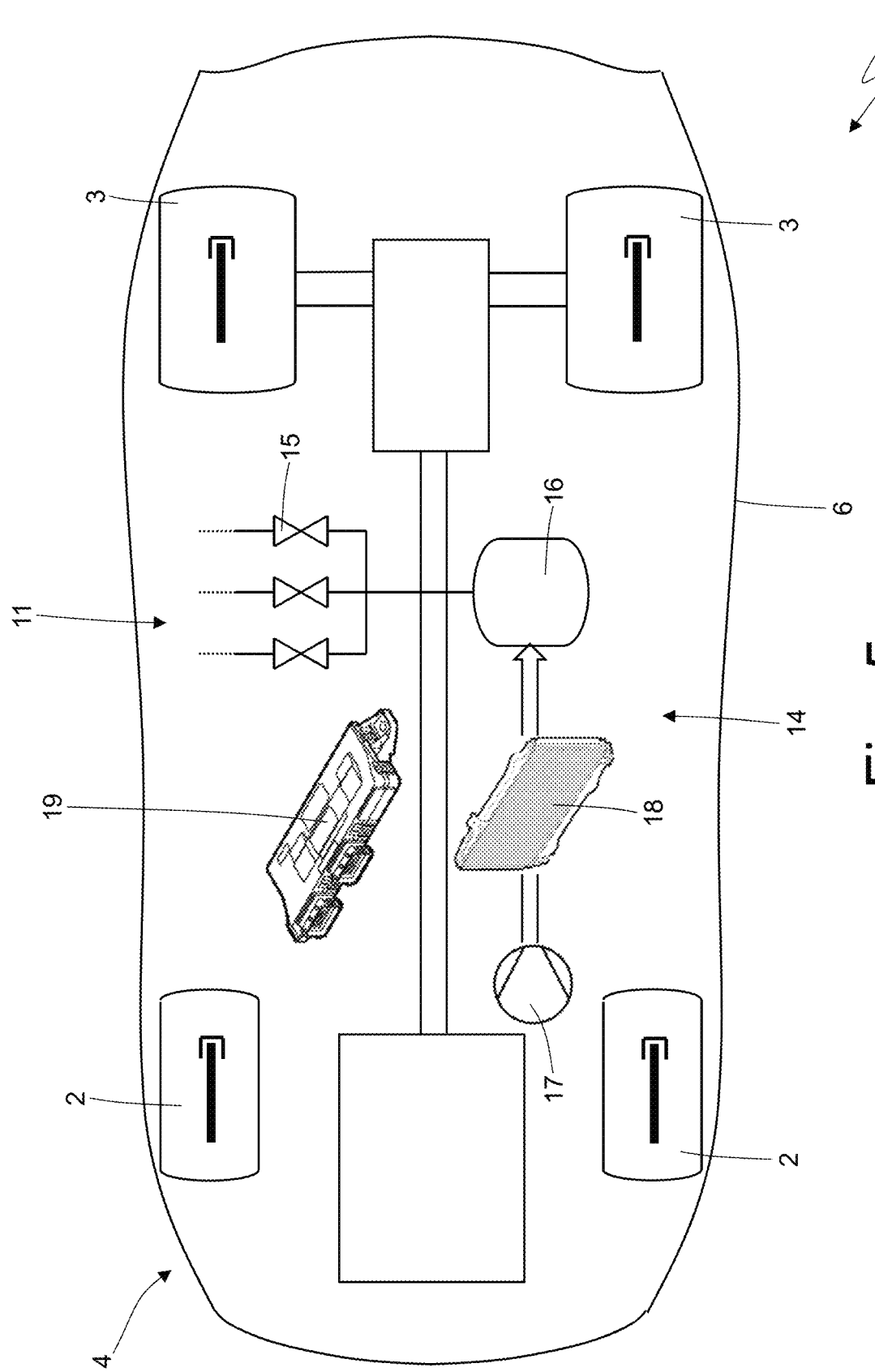
FIG. 5 is a schematic plan view of the car of FIG. 1.

According to FIG. 5, each pneumatic wiper 11 also comprises a source 14 of compressed air and (at least) a control valve 15, which is interposed between the nozzles 12 and the compressed air source 14 and is designed to regulate the compressed air flow.

Generally speaking, each pneumatic wiper 11 comprises one single control valve 15, which opens or closes the supply of compressed air to all nozzles 12, but, alternatively, there can be several valves 15 for a same pneumatic wiper 11, thus dividing the nozzles 12 into different areas controlled independently of one another (obviously, thus solution mainly applies when the corresponding transparent element 6, 9 or 10 is large-sized, which is the case with the windscreen 6); for example, in the case of the windscreen 6, the sole area of the windscreen 6 in front of the driver could be kept clean (by not supplying compressed air to the nozzles 12 arranged in front of the passenger) when the passenger's seat is empty (the absence/presence of the passenger is a known item of information thanks to the sensors used to warn that the set belts are not fastened).

Generally speaking, each control valve 15 is an ON/OFF valve and is adapted to only assume an open position or a closed position; this solution is preferable for it is simpler, more economic and more energetically efficient and it allows anyway for an action of the pneumatic wiper 11 divided into parts, modulating the timely duration and/or the frequency of the single openings of the control valve 15.

According to the preferred embodiment shown in FIG. 5, the compressed air source 14 is common to all pneumatic wipers 11, namely the pneumatic wipers 11 share the same compressed air source 14, which is only one.

The (single) common compressed air source 14 comprises a compressed air tank 16, which is connected to the control valves 15, and a compressor 17, which supplies the compressed air tank 16.

A heat exchanger 18 is provided, which is interposed between the compressor 17 and the compressed air tank 16 and is adapted to cool down the compressed air supplied by the compressor 17 to the compressed air tank 16, thus reducing the volume occupied by the compressed air in the compressed air tank 16; thanks to the cooling of the compressed air supplied by the compressor 17 to the compressed air tank 16, a greater quantity (mass) of compressed air can be stored in the compressed air tank 16, the pressure being equal.

According to a preferred embodiment, the compressor 17 directly receives the motion from an internal combustion engine of the car 1. Alternatively, the compressor 17 receives the motion from a front axle (namely, from the two front wheels 2) or from a rear axle (namely, from the two rear wheels 3); in other words, a rotor of the compressor 17 can be connected to the front axle (namely, to the two front wheels 2) or to the rear axle (namely, to the two rear wheels 3) in order to be operated by the front wheels 2 or by the rear wheels 3 (thus, exploiting the motion of the front wheels 2 or the motion of the rear wheels 3).

According to a preferred embodiments, a control unit 19 activates the compressor 17, using the motion received from the wheels 2 or 3 or from the internal combustion engine 4, (especially) during the braking phase so as to use the kinetic energy owned by the car 1, which otherwise would be dissipated in heat by the braking system.

According to other embodiments which are not shown herein, a pneumatic wiper 11 is used to clean a transparent element covering an optical sensor (for example a camera) of the car 1, which is used for the autonomous driving mode, or a transparent element protecting turn signals or rear lamps.

In the embodiment shown in the accompanying figures, the pneumatic wiper 11 is mounted on a car 1; according to other embodiments which are not shown herein, the pneumatic wiper 11 is mounted on a different type of road vehicle (for example, vans, trucks or buses) or also on a non-road vehicle (for example, streetcars, locomotives, aircraft, boats).

The embodiments described herein can be combined with one another, without for this reason going beyond the scope of protection of the invention.

The pneumatic wiper 11 described above has numerous advantages.

First of all, the pneumatic wiper 11 described above is completely "invisible" (namely, hidden) both from an aerodynamic point of view (namely, it does not worsen aerodynamic efficiency) and from an aesthetic point of view.

Furthermore, the pneumatic wiper 11 described above does not require any type of periodic maintenance and basically is "self-cleaning" (namely, is capable of eliminating possible deposits or dirt building up on it when the vehicle remains parked outdoor for a long time by itself).

The pneumatic wiper 11 described above has, close to the transparent element 6, 9 or 10, a very small size (the compressed air source 14 and the control valve 15 can be placed away from the nozzles 12) and, hence, does not pose any significant limitation to the definition of the architecture of the car.

The pneumatic wiper 11 described above completely remains within the dimensions of car body and, therefore, is not subjected to the risk of accidental damages, for example when the vehicle is washed in automated washing stations.

Finally, the pneumatic wiper 11 described above, for it can share one single source 12 of compressed air with all the other pneumatic wipers 11 installed in the same car 1, allows, with a moderate cost increase, all transparent elements of the car 1 to be cleaned.

LIST OF THE REFERENCE NUMBERS OF THE FIGURES 1 car
2 front wheels
3 rear wheels
4 passenger compartment
5 doors
6 windscreen
7 front hood
8 headlamps
9 transparent glass 10 rear hood
11 pneumatic wipers
12 nozzles
13 compressed air jet
14 compressed air source
15 control valve
16 tank
17 compressor
18 heat exchanger
19 control unit
D travel direction

The invention claimed is:

1. A pneumatic windscreen wiper (11) for a transparent element (6; 9; 10) of a vehicle (1); the pneumatic windscreen wiper (11) comprises:
- at least one nozzle (12) which is arranged at an edge of the transparent element (6; 9; 10), is oriented towards the transparent element (6; 9; 10), and is capable of emitting a compressed air jet (13) that hits the transparent element (6; 9; 10) to skim the transparent element (6; 9; 10);
- a source (14) of compressed air comprising a compressed air tank (16) and a compressor (17) which is adapted to supply compressed air into the tank (16); and
- a control valve (15) which is interposed between the nozzle (12) and the source (14) of compressed air and is suitable for regulating the flow of compressed air;
- wherein the source (14) of compressed air comprises a heat exchanger (18) which is interposed between the compressor (17) and the compressed air tank (16) and is suitable for cooling the compressed air which is supplied by the compressor (17) to the compressed air tank (16).

2. The pneumatic windscreen wiper (11) according to claim 1, wherein the compressed air jet (13) emitted by the nozzle (12) is oriented parallel to the transparent element (6; 9; 10).

3. The pneumatic windscreen wiper (11) according to claim 1, wherein the nozzle (12) is shaped to emit the compressed air jet (13) at supersonic speed.

4. The pneumatic windscreen wiper (11) according to claim 1, wherein the nozzle (12) is arranged at a front edge of the transparent element (6; 9; 10) with respect to a travel direction (D) of the vehicle (1).

5. The pneumatic windscreen wiper (11) according to claim 1 further comprising a plurality of the nozzles (12) arranged side by side and at a certain distance from each other along the edge of the transparent element (6; 9; 10).

6. The pneumatic windscreen wiper (11) according to claim 1, wherein the control valve (15) is of the ON/OFF type and is capable of assuming only an open position and a closed position.

7. The pneumatic windscreen wiper (11) according to claim 1, wherein the nozzle (12) has an elongated shape having a transverse dimension which is perpendicular to a travel direction (D) of the vehicle (1) greater than a longitudinal dimension which is parallel to the travel direction of the vehicle (1).

8. A vehicle (1) comprising:
- a transparent element (6; 9; 10); and
- a pneumatic windscreen wiper (11) according to claim 1.

9. The vehicle (1) according to claim 8, wherein the compressor (17) receives the motion directly from an internal combustion engine of the vehicle (1).

10. The vehicle (1) according to claim 8, wherein the compressor (17) receives motion from a front axle or from a rear axle of the vehicle (1).

* * * * *